(12) United States Patent
McCormack et al.

(10) Patent No.: US 7,895,174 B2
(45) Date of Patent: Feb. 22, 2011

(54) DATABASE PART TABLE JUNCTIONING

(75) Inventors: Michael J. McCormack, Snohomish, WA (US); Scott T. Gardner, Seattle, WA (US); Andrew R. Miller, Issaquah, WA (US); Sumit Chauhan, Sammamish, WA (US); Jason A. Bould, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 420 days.

(21) Appl. No.: 12/057,075

(22) Filed: Mar. 27, 2008

(65) Prior Publication Data

US 2009/0248710 A1    Oct. 1, 2009

(51) Int. Cl.
*G06F 17/30* (2006.01)
(52) U.S. Cl. ............... 707/705; 707/714; 707/792; 707/793; 707/802; 707/803; 707/808
(58) Field of Classification Search ............ 707/1, 707/10, 100, 101, 102, 104.1, 705, 713, 714, 707/791, 802, 803, 806, 807, 808, 809, 810, 707/999.001, 999.1, 792, 793
See application file for complete search history.

(56) References Cited

U.S. PATENT DOCUMENTS

| | | | |
|---|---|---|---|
| 5,826,257 A * | 10/1998 | Snelling, Jr. .................. | 1/1 |
| 6,065,002 A | 5/2000 | Knotts et al. | |
| 6,167,405 A * | 12/2000 | Rosensteel et al. .................. | 1/1 |
| 6,466,937 B1 | 10/2002 | Fascenda | |
| 6,587,856 B1 * | 7/2003 | Srinivasan et al. ........... | 707/802 |
| 6,970,861 B2 | 1/2005 | Messler | |
| 6,934,740 B1 | 8/2005 | Lawande et al. | |
| 6,996,589 B1 | 2/2006 | Jayaram et al. | |
| 7,072,896 B2 * | 7/2006 | Lee et al. ..................... | 1/1 |
| 7,111,231 B1 | 9/2006 | Huck et al. | |
| 7,152,070 B1 * | 12/2006 | Musick et al. ................ | 1/1 |
| 7,181,450 B2 * | 2/2007 | Malloy et al. ................ | 1/1 |
| 7,269,593 B2 * | 9/2007 | Minamino et al. .................. | 1/1 |
| 7,289,997 B1 * | 10/2007 | Kita et al. ..................... | 1/1 |
| 7,305,614 B2 * | 12/2007 | Chen et al. .................. | 715/234 |

(Continued)

OTHER PUBLICATIONS

Judith Bayard Cushing et al.: "Template-driven End-User Ecological Database Design", JIIS, 2007, pp. 1-5. http://intranet.Iternet.edu/archives/documents/presentations/sci2002/sci2002_ecological_database_design.pdf.

(Continued)

*Primary Examiner*—Don Wong
*Assistant Examiner*—Thanh-Ha Dang
(74) *Attorney, Agent, or Firm*—Merchant & Gould

(57) ABSTRACT

Embodiments are provided to define relationships for merging template or database part tables with one or more database tables in a computer system. A database application may utilize a schema to receive metadata associated with a target database part table in one or more markup language elements. The database application may then receive metadata associated with a source database table to be joined with the target table in the schema elements. The database application may then receive join type metadata in the schema elements. The join type metadata may specify whether fields from the source table are to be merged into the target table or whether fields from the target table are to be merged into the source table. In response to receiving the target table metadata and the source table metadata, the database application may then merge the target and source tables utilizing the join type metadata.

8 Claims, 8 Drawing Sheets

U.S. PATENT DOCUMENTS

| | | | |
|---|---|---|---|
| 7,313,575 B2* | 12/2007 | Carr et al. | 1/1 |
| 7,318,216 B2* | 1/2008 | Diab | 717/108 |
| 7,505,993 B2* | 3/2009 | Chan et al. | 1/1 |
| 2004/0015476 A1 | 1/2004 | Twaddle | |
| 2004/0122844 A1* | 6/2004 | Malloy et al. | 707/102 |
| 2004/0215626 A1* | 10/2004 | Colossi et al. | 707/100 |
| 2004/0243550 A1* | 12/2004 | Gu et al. | 707/3 |
| 2004/0243591 A1* | 12/2004 | Gu et al. | 707/100 |
| 2005/0055354 A1* | 3/2005 | Thompson et al. | 707/100 |
| 2005/0066306 A1* | 3/2005 | Diab | 717/108 |
| 2005/0172261 A1* | 8/2005 | Yuknewicz et al. | 717/106 |
| 2005/0197997 A1 | 9/2005 | Hopkins et al. | |
| 2006/0020586 A1* | 1/2006 | Prompt et al. | 707/3 |
| 2006/0235834 A1* | 10/2006 | Blakeley et al. | 707/4 |
| 2007/0083543 A1 | 4/2007 | Chen et al. | |
| 2007/0083851 A1 | 4/2007 | Huang et al. | |
| 2007/0094289 A1* | 4/2007 | Vandersluis | 707/101 |
| 2008/0189643 A1* | 8/2008 | Hooper et al. | 715/772 |
| 2009/0031230 A1* | 1/2009 | Kesler | 715/764 |

OTHER PUBLICATIONS

Ricardo Olivieri et al.: "Generating XML Templates for Jasper Reports Using Rational Application Developer", May 25, 2005. http://www.ibm.com/developerworks/websphere/library/techarticles/0505_olivieri/0505_olivieri.html.

Tomo Helman: "Application Generator Based on Parameterized Templates" 26th CITI, Jun. 7-10, 2004, , Cavtat, ISBN: 953-96769-9-1, pp. 151-157, vol. 1. http://ieeexplore.ieee.org/iel5/9452/30001/01372393.pdf?isNumber=&htry=2.

* cited by examiner

DATABASE PART TABLE JUNCTIONING

BACKGROUND

Many database software applications allow the creation and utilization of database templates to facilitate the building of solutions using database data. For example, a user may create a template comprising a form or table with appropriate fields to facilitate the input of contact data for doctors employed by a medical facility and may further create another template comprising a table with fields to input patient contact data. Currently however, database applications do not allow for the defining of relationships which specify how database template tables are joined with one or more database tables in an existing database. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to define a junction or join relationship which may be utilized to merge template or database part tables (i.e., target tables) with one or more database tables (i.e., source tables) in a computer system. In one embodiment, a schema may be utilized by a database application executing on a computer system to merge a database part table with a database table. The database application may receive target table metadata associated with a target database part table in one or more elements of a markup language file defined by the schema. The database application may then receive source table metadata associated with a source database table to be joined with the target table in the elements of the schema. The database application may then receive join type metadata in the elements of the schema. The join type metadata may specify records (i.e., fields) from the source table are merged into the target table or whether records (i.e., fields) from the target table are merged into the source table. In response to receiving the target table metadata and the source table metadata, the database application may then merge the target and source tables utilizing the join type metadata.

In another embodiment, a protocol may be utilized to facilitate communication between a database application and a database web service for retrieving metadata for merging a database part table with a database table. A metadata request may be transmitted to the web service from the database application. In response to the metadata request, the database application may receive metadata which includes markup language elements defined by a schema. The markup language elements define relationships as to how the tables are to be joined. The database application may then utilize the received metadata to merge the database part table with the database table.

In yet another embodiment, a database application may be utilized to generate a user interface for defining a junction or join relationship which may be utilized to merge template or database part tables (i.e., target tables) with one or more database tables (i.e., source tables). The user interface may include a dropdown box for choosing a database table from among a group of database tables as a source table to merge with a database part or target table. Upon selecting a source table in the user interface to merge with the target table, a relationship is created in which a target table lookup field in the target table refers to a name associated with the source table. The created relationship may then be utilized by a database application to merge the target and source tables.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Figure 1:
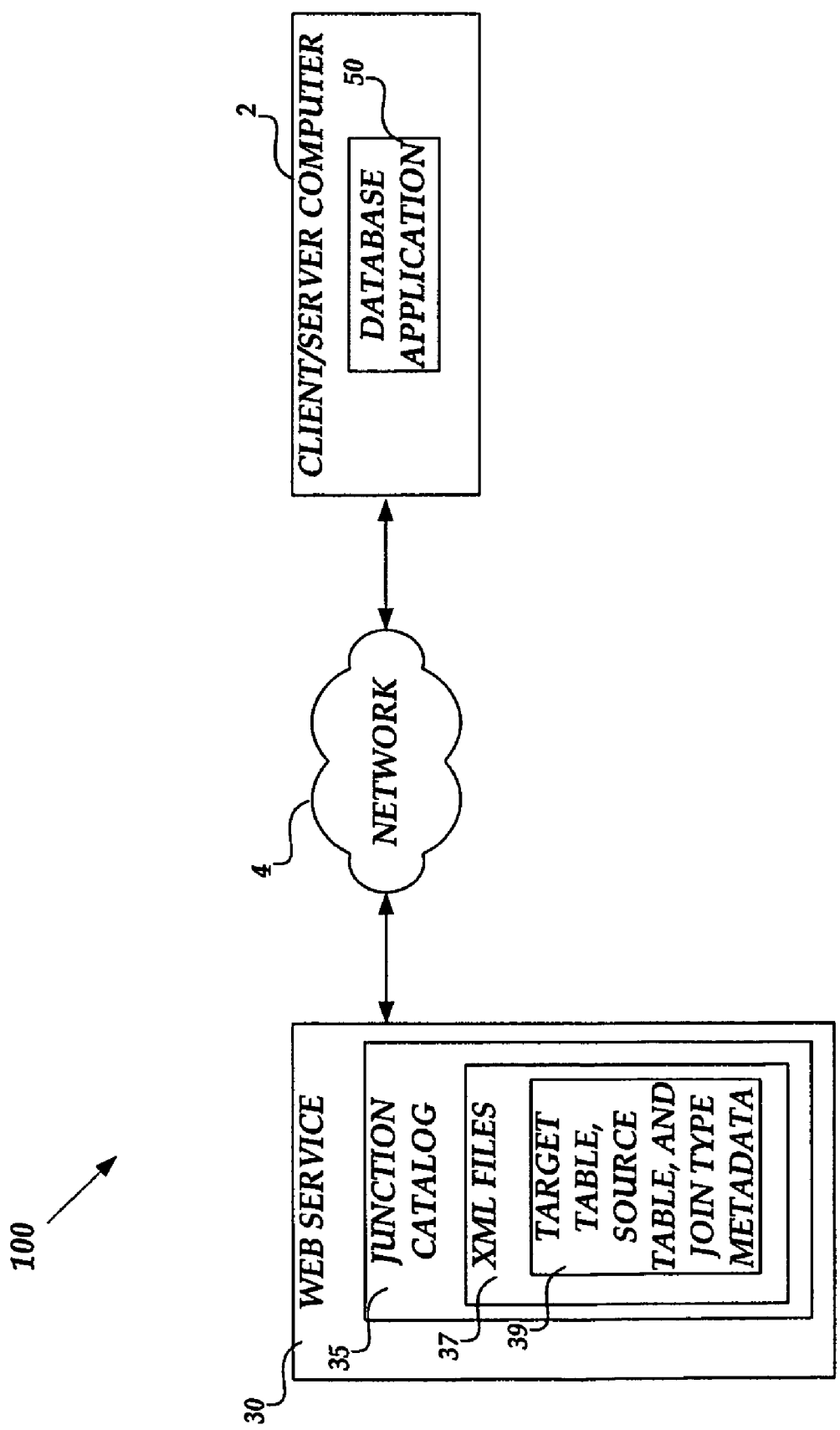
FIG. 1 is a block diagram illustrating a networked computing environment which may be utilized for defining relationships which may be utilized to merge database part tables with database tables, in accordance with various embodiments.

Embodiments are provided to define a junction or join relationship which may be utilized to merge template or database part tables (i.e., target tables) with one or more database tables (i.e., source tables) in a computer system. In one embodiment, a schema may be utilized by a database application executing on a computer system to merge a database part table with a database table. The database application may receive target table metadata associated with a target database part table in one or more elements of a markup language file defined by the schema. The database application may then receive source table metadata associated with a source database table to be joined with the target table in the elements of the schema. The database application may then receive join type metadata in the elements of the schema. The join type metadata may specify records (i.e., fields) from the source table are merged into the target table or whether records (i.e., fields) from the target table are merged into the source table. In response to receiving the target table metadata and the source table metadata, the database application may then merge the target and source tables utilizing the join type metadata.

In another embodiment, a protocol may be utilized to facilitate communication between a database application and a database web service for retrieving metadata for merging a database part table with a database table. A metadata request may be transmitted to the web service from the database application. In response to the metadata request, the database application may receive metadata which includes markup language elements defined by a schema. The markup language elements define relationships as to how the tables are to be joined. The database application may then utilize the received metadata to merge the database part table with the database table.

In yet another embodiment, a database application may be utilized to generate a user interface for defining a junction or join relationship which may be utilized to merge template or database part tables (i.e., target tables) with one or more database tables (i.e., source tables). The user interface may include a dropdown box for choosing a database table from among a group of database tables as a source table to merge with a database part or target table. Upon selecting a source table in the user interface to merge with the target table, a relationship is created in which a target table lookup field in the target table refers to a name associated with the source table. The created relationship may then be utilized by a database application to merge the target and source tables.

Referring now to the drawings, in which like numerals represent like elements, various illustrative embodiments will now be described.

FIG. 1 is a block diagram illustrating a networked computing environment 100 which may be utilized for defining relationships which may be utilized to merge database part tables with database tables, in accordance with various embodiments. The networked computing environment 100 includes a client/server computer 2 (hereinafter referred to as the "computer 2") which is in communication with a web service 30 over a network 4. It should be understood that in accordance with various embodiments, the computer 2 may function as either a client computer or a server computer in the network 4). The computer 2 may store a database application 50 which, as will be described in greater detail below in the discussion of FIGS. 2-8, may be utilized to define relationships which may be utilized to merge template or database part tables with one or more database tables. As will be described in greater detail herein, the relationships (or junctions) may define how the tables are to be combined (i.e., joined or merged together).

The network 4 may include a local network or a wide area network (e.g., the Internet). In accordance with various embodiments, the web service 30 may comprise a server computer which may be configured to utilize a protocol for communicating metadata 39 (i.e., target table, source table, and join type metadata) with the database application 50. The metadata 39 may be stored in one or more extensible markup language ("XML") files in a junction catalog 35 on the web service 30. The metadata 39 may include markup language elements (such as XML elements) defined by a schema. The markup language elements define relationships as to how tables are to be combined. The database application 50 may then utilize the received metadata to join or merge one or more database part tables with a database table.

Exemplary Operating Environment

Figure 2:
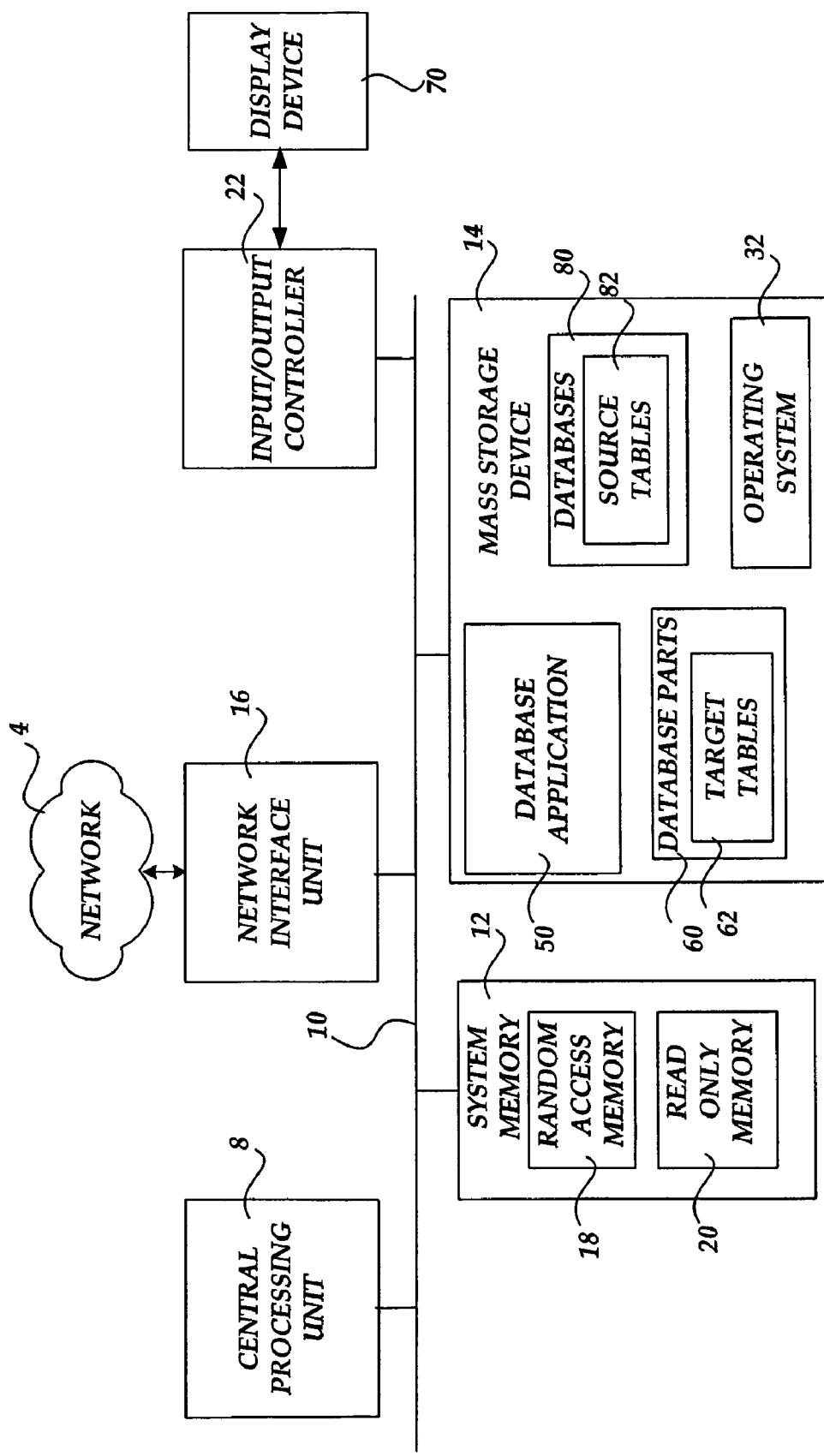
FIG. 2 is a block diagram illustrating a computing environment which may be utilized for defining relationships which may be utilized to merge database part tables with database tables, in accordance with various embodiments.

Referring now to FIG. 2, the following discussion is intended to provide a brief, general description of a suitable computing environment in which various illustrative embodiments may be implemented. While various embodiments will be described in the general context of program modules that execute in conjunction with program modules that run on an operating system on a personal computer, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with other computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 2 shows the computer 2 which may include a general purpose desktop, laptop, handheld, tablet, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. As discussed above with respect to FIG. 1, the computer 2 may function as either a client computer or a server computer in accordance with various embodiments.

The computer 2 further includes a mass storage device 14 for storing an operating system 32, the database application 50, database parts 60, and databases 80. The database parts 60 may include tables such as target tables 62. The databases 80 may include tables such as source tables 82. In accordance with various embodiments, the operating system 32 may be suitable for controlling the operation of a networked personal computer, such as the WINDOWS operating systems from MICROSOFT CORPORATION of Redmond, Wash. The database application 50 may comprise the ACCESS database creation and management desktop application program, also from MICROSOFT CORPORATION of Redmond, Wash. In accordance with various embodiments, the database application 50 may be utilized to define relationships for merging one or more of the target tables 62 in the database parts 60 with one or more of the source tables 82 in the databases 80. A "merge" is defined as the creation of a new table having a relationship with the individual tables being merged. For example, in accordance with an embodiment, the database application 50 may be utilized to create a relationship between a source table and a target table containing doctor information using a target lookup field in the target table. This relationship may then be utilized to merge the source and target tables.

It should be understood that, as defined herein, the database parts 60 may include, but are not limited to, tables, data types, field combinations or entire databases. The database parts 60 may be utilized to facilitate the building of solutions to accomplish basics tasks such as entering contact information in a database table. The database parts 60 may be stored as files (e.g., template files) on the computer 2.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network or a wide area network (e.g., the Internet), for example. The computer 2 may connect to the network 4 through a network interface unit 16 connected to the bus 10. It should be appreciated by those skilled in the art that when operating in a networked environment, the computer 2 may be in communication with one or more remote servers hosting a shared database services platform such as the EXCEL/ACCESS SERVICES platform from Microsoft Corporation of Redmond, Wash. It should be appreciated that the network interface unit 16 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display device 70, a printer, or other type of output device. Additionally, a touch screen can serve as an input and an output mechanism.

As mentioned briefly above, a number of program modules and data files may be stored in the mass storage device 14 and RAM 18 of the computer 2 such as the operating system 32. The mass storage device 14 and RAM 18 may also store one or more program modules.

Figure 3:
FIG. 3 is an illustrative schema which may be utilized to define relationships for merging database part tables and database tables, in accordance with one embodiment.

FIG. 3 is an illustrative schema 300 which may be utilized to define relationships for merging database part tables and database tables, in accordance with an embodiment. The schema 300 includes markup language elements (e.g., XML elements) defining optional relationships for merging database tables and which may be accessed by the database application 50 from the web service 30. The markup language elements may include, but are not limited to, an MSysRelationships element 302, an OptionalRelationships element 304, an OptionalRelationship element 306, a SourceTableID element 308, a SourceTableName element 310, a SourceFieldIDKey element 312, a SourceFieldIDLookup element 314, a TargetTableID element 316, a TargetTableName element 318, a TargetLookupField element 320, an ID element 322, a Name element 324, a Caption element 326, a Required element 328, an Indexed element 330, an AllowMultipleValues element 332, a JoinType element 336, and an EnforcedReferentialIntegrity element 338.

The OptionalRelationships element 304 may include the attributes TemplateTable (i.e., database part table), which is a reference to an ID stored in a template or database part file, and DatabaseTable which is a reference to an ID stored in a database. Optional relationships may include a collection of relationships for merging that may be added to a given database combination by a user of the database application 50. Thus, the user has the option to accept or reject the merges defined by the relationships. The OptionalRelationships element 304 may occur N times in a given database part or template file and functions as a container for a complete set of relationships. If accepted by a user, all relationships for a given table will be applied.

The OptionalRelationship element 306 describes individual relationships which may be individually accepted or rejected. The OptionalRelationship element 306 may occur N times within the OptionalRelationships element 304.

The SourceTableID element 308 uses the ID from either a database part table or a database table to reference an object (i.e., table) that is the source of the relationship to be defined between the two tables. For example, in the schema 300, a Contact database part table is defined as the source of the relationship to be defined between the Contact database part table and an Issues database table.

The SourceTableName element 310 may include the name of the database part table to be used in a user interface for merging the database part table with a database table. The SourceFieldIDKey element 312 may be utilized to provide a "key" for the source table. The key defined by the SourceFieldIDKey element 312 is a primary key of the table being looked up to by a target table.

The SourceFieldIDLookup element 314 may be utilized to provide the field in the source table to use as the lookup value to be utilized by the target table. For example, the lookup value in the source table "Contact" may be the field "Contact Name" which appears in the Contact database part table The TargetTableID element 316 uses the ID from either a database part table or a database table to reference an object (i.e., table) that is the target of the relationship to be defined between the two tables. For example, in the schema 300, an Issues database table is defined as the target of the relationship to be defined between the Contact database part table and the Issues database table.

The TargetTableName element 318 may include the name of the database table (e.g., "Issues Table") to be used in a user interface for merging the database table with a database part table. The TargetLookupField element 320 may include various sub-elements for defining the relationship of the target table with the source table. These sub-elements may include the ID element 322 which may be utilized to point to the table (i.e., the source table) that contains the primary key and the Name element 324 which may be utilized to provide the name of the field that will be created for a lookup column. The lookup column may comprise a column which contains values to be utilized as the contents of at least one field located in the source table. The sub-elements may further include the Caption element 326 which may be utilized to provide a caption for the field that will be created for the lookup column, the Required element 328 which may be utilized to determine whether or not a user must select a value for a lookup column field, the Indexed element 330 may be utilized to determine whether or not a lookup column field is indexed and further whether or not the field is unique, and the Allow- MulitpleValues element 332 which may be utilized to determine whether the lookup column field allows multiple values.

The JoinType element 336 may be utilized to identify a join type for merging the source and target tables. The JoinType element 336 may include the attributes SourceOuterJoin and TargetOuterJoin. In accordance with various embodiments, SourceOuterJoin defines a type of merge in which records from the source table are merged into the target table and TargetOuterJoin defines a type of merge in which records from the target table are merged into the source table. The EnforcedReferentialIntegrity element 338 may be utilized to determine whether to enforce one or more rules associated with the join relationship between the source and target tables. For example, the Enforced ReferentialIntegrity element 338 may include a CascadeDelete attribute for determining whether or not cascade deletes are allowed in the tables.

Figure 4:
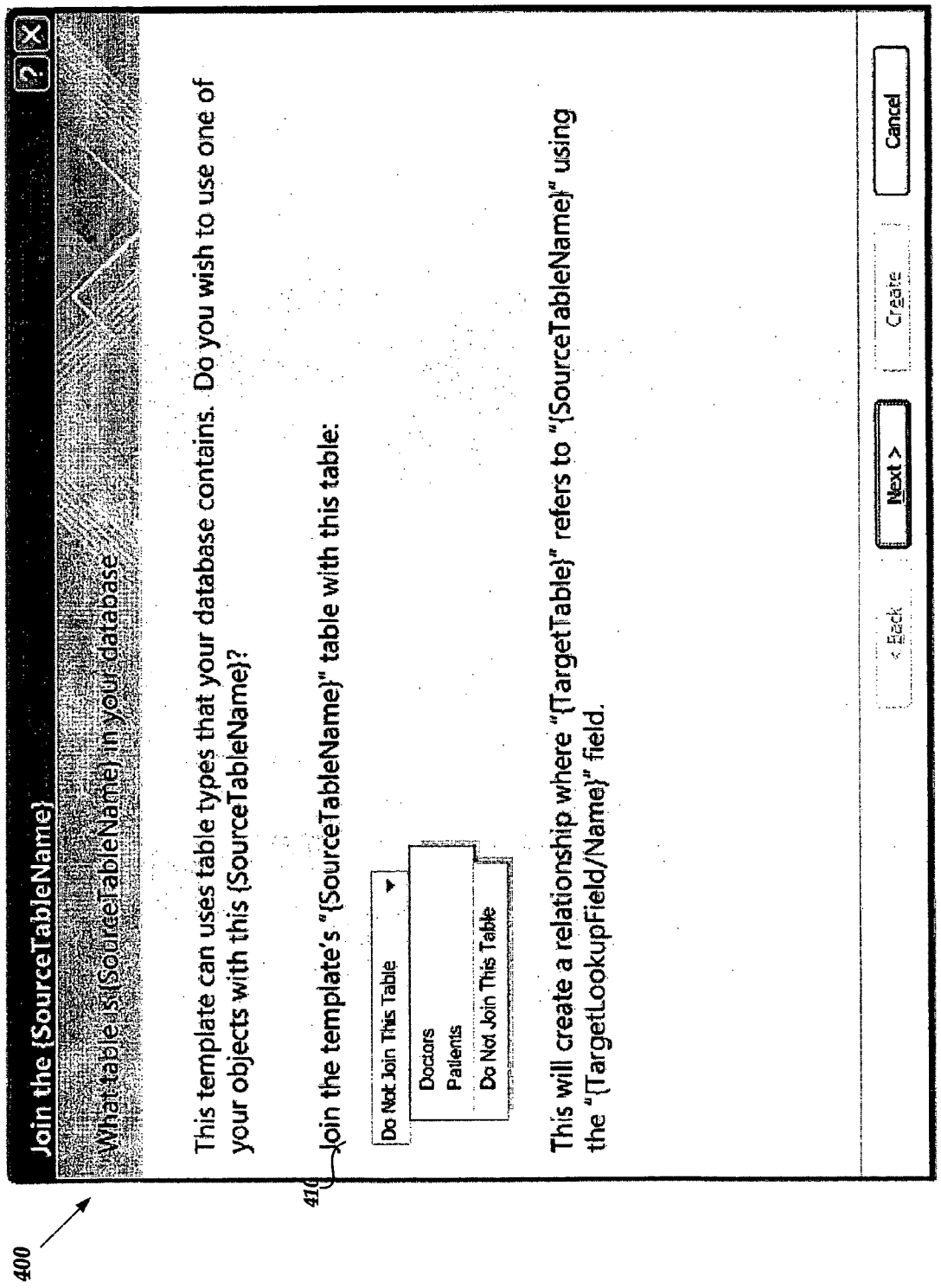
FIG. 4 is a computer screen display of a user interface which may be utilized to define relationships for merging a target database part table with a source database table, in accordance with one embodiment.

FIG. 4 is a computer screen display of a user interface 400 generated by the database application 50, which may be utilized to define relationships for merging a target database part table with a source database table, in accordance with one embodiment. The user interface 400 includes a combo box 410 for choosing a database table from a drop-down list of database tables (e.g., "Doctors" and "Patients") as a source table to merge with a target database part table. In response to the selection of the source table, the database application 50 may be configured to create a relationship where the target table refers to the name of the source table using the TargetLookupField element 320 defined in the schema 300 (discussed above with respect to FIG. 3).

Figure 5:
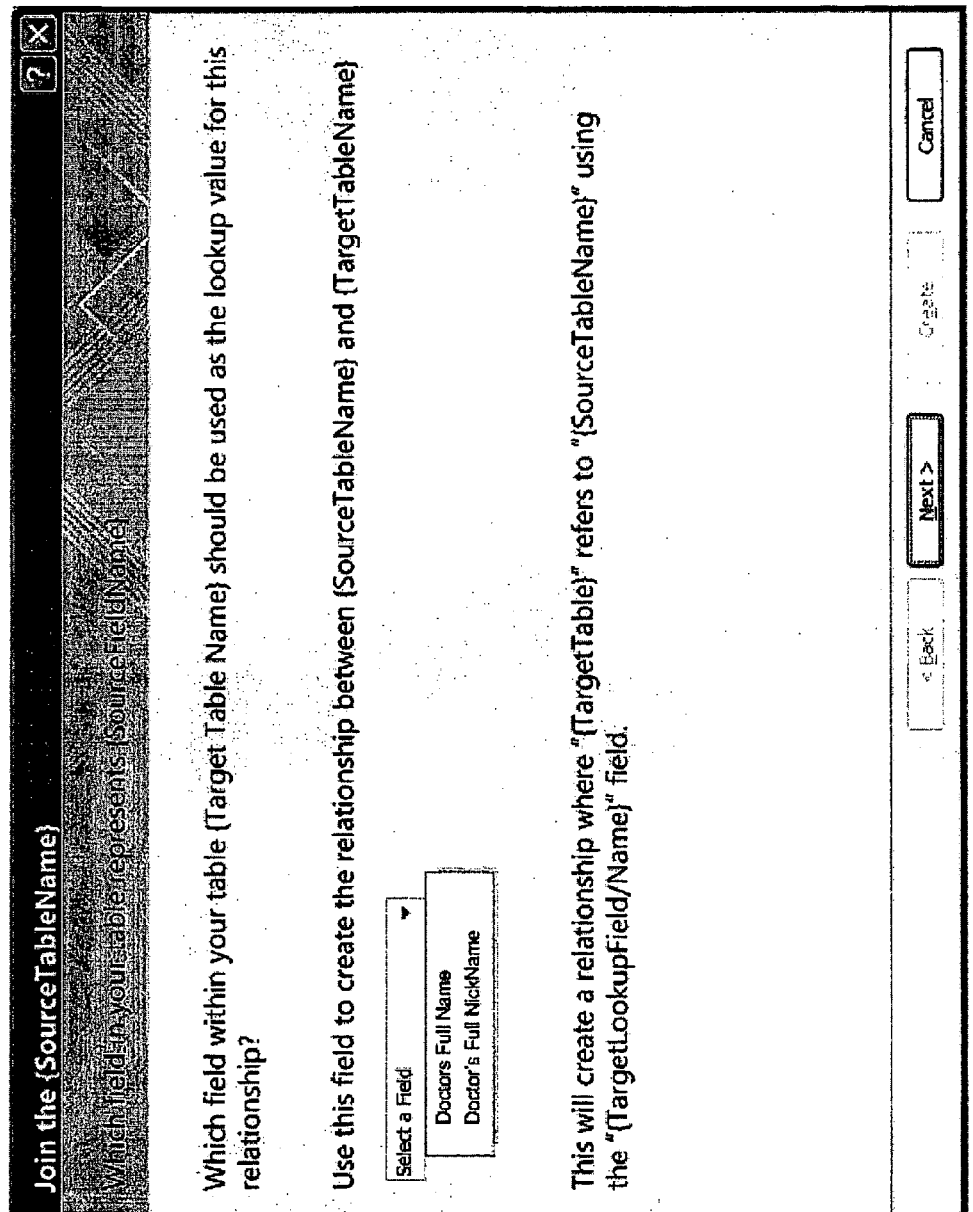
FIG. 5 is a computer screen display of a user interface for determining a lookup value field to be utilized in defining relationships for merging a target database part table with a source database table, in accordance with one embodiment.

FIG. 5 is a computer screen display of a user interface 500 generated by the database application 50, for determining a lookup value to be utilized in defining relationships for merging a target database part table with a source database table, in accordance with one embodiment. The user interface 500 includes a combo box 510 for selecting a field in the source table from a drop-down list of database fields (e.g., "Doctor's Full Name" and "Doctor's Full Nickname") to be utilized as the target table lookup field for the relationship to be created with the target table. The user interface 500 may be generated in response to a determination by the database application 50 that at least two duplicate source table field identifications exist in the source table. The selected field may be utilized by the database application 50 as the lookup value for the relationship between the source table and the target table.

Figure 6:
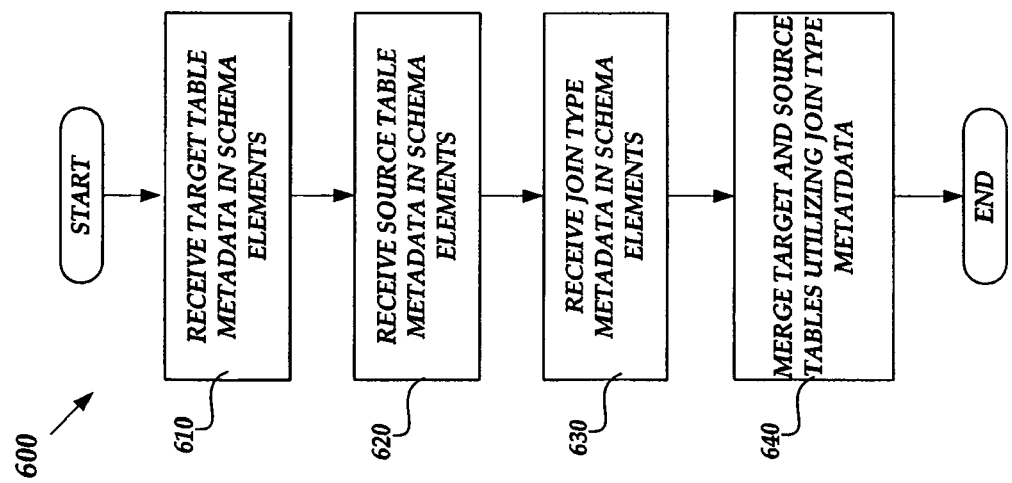
FIG. 6 is a flow diagram illustrating a routine for utilizing a schema to define relationships for merging a database part table with a database table, in accordance with one embodiment.

FIG. 6 is a flow diagram 600 illustrating a routine for utilizing a schema to define relationships for merging a database part table with a database table, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 6-8 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 600 begins at operation 610, where the database application 50 executing on the computer 2 receives the target table metadata 39 in the elements of the schema for defining a relationship for merging a target table (i.e., a database part table) with a source table (i.e., a database table). In accordance with an embodiment, the database application 50 may request the target table metadata 39 contained in the XML files 37 from the junction catalog 35 stored in the web service 30 (see FIG. 1) utilizing a protocol (described in greater detail herein with respect to FIG. 7). In accordance with another embodiment, the target table metadata 39 may be retrieved from a file (not shown) stored on the computer 2. As discussed above with respect to FIG. 3, the target table metadata 39 may include the TargetLookupField element 320 and the sub-elements 322-332 which describe the class of tables associated with a lookup column field in the lookup column, a string used to identify a name for the lookup column field, a string used to provide a caption for the lookup column field in a user interface generated by the database application 50, a required property value for the lookup column field, an index value for the lookup column field, and whether the lookup column field allows multiple values.

From operation 610, the routine 600 continues to operation 620, where the database application 50 receives the source table metadata 39 in the elements of the schema for defining a relationship for merging the target table with the source table. In accordance with an embodiment, the database application 50 may request the source table metadata 39 contained in the XML files 37 from the junction catalog 35 stored in the web service 30 (see FIG. 1) utilizing a protocol (described in greater detail herein with respect to FIG. 7). In accordance with another embodiment, the source table metadata 39 may be retrieved from a file (not shown) stored on the computer 2. In accordance with an embodiment, the source table metadata 39 may be associated with a database which includes a source table to be joined with the target table. The source table metadata 39 may describe a relationship to a class of tables existing outside of the target table. As discussed above with respect to FIG. 3, the source table metadata 39 may include the SourceTableID element 308, the SourceTableName element 310, the SourceFieldIDKey element 312, and the SourceFieldIDLookup element 314.

From operation 620, the routine 600 continues to operation 630, where the database application 50 receives the join type metadata 39 in the elements of the schema for defining a relationship for merging the target table with the source table. In accordance with an embodiment, the database application 50 may request the join type metadata 39 contained in the XML files 37 from the junction catalog 35 stored in the web service 30 (see FIG. 1) utilizing a protocol (described in greater detail herein with respect to FIG. 7). In accordance with another embodiment, the join type metadata 39 may be retrieved from a file (not shown) stored on the computer 2. As discussed above with respect to FIG. 3, the join type metadata 39 may include attributes a source outer join in which records from the source table are merged into the target table or a target outer join in which records from the target table are merged into the source table.

From operation 630, the routine 600 continues to operation 640, where the database application 50 may be utilized to merge the target and source tables utilizing the join type metadata. That is, the database application 50 may perform a source outer join or a target outer join to merge the records in the source and target tables. From operation 640, the routine 600 then ends.

Figure 7:
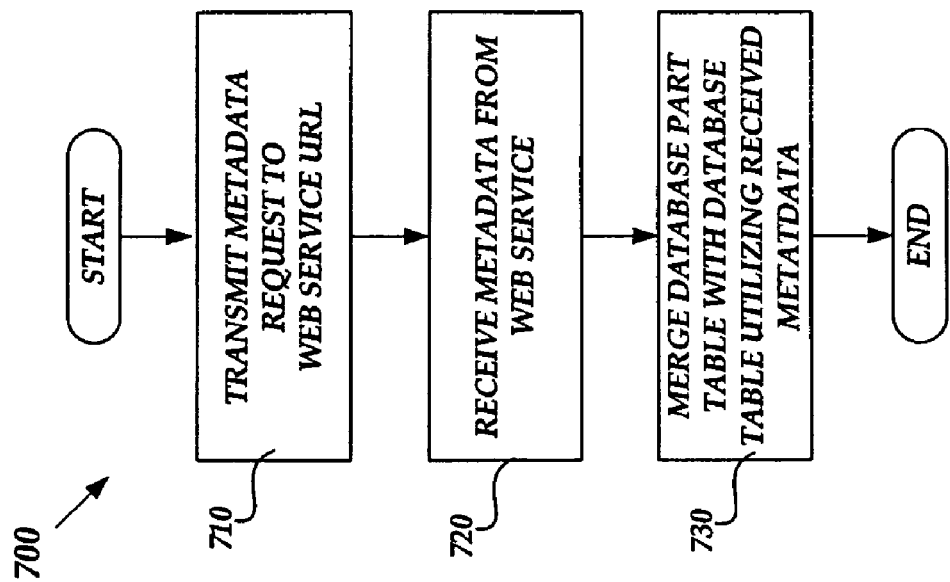
FIG. 7 is a flow diagram illustrating a routine for communication between a database application and a database web service to retrieve metadata utilized in defining relationships for merging a database part table with a database table, in accordance with one embodiment.

FIG. 7 is a flow diagram illustrating a routine 700 for communication between a database application and a database web service to retrieve metadata utilized in defining relationships for merging a database part table with a database table, in accordance with an embodiment. The routine 700 begins at operation 710, where the database application 50 executing on the computer 2 transmits a metadata request to a Uniform Resource Locator ("URL") associated with the web service 30. In accordance with an embodiment, the metadata request may a HyperText Transfer Protocol ("HTTP") request and may include a class for the target table (i.e., database part table) and a class for the source table (i.e., database table) to be merged with the target table. In particular, the metadata request may be transmitted to the junction catalog 35 stored in the web service 30 and may include a request for the target table, source table, and join type metadata 39.

From operation 710, the routine 700 continues to operation 720, where the database application 50 may be utilized to receive the requested metadata from the web service 30. In particular, the database application 50 may receive the target table, source table, and join type metadata 39 from the web service 30.

From operation 720, the routine 700 continues to operation 730, where the database application 50 may be utilized to merge the target and source tables utilizing the metadata received from the web service 30. For example, the database application 50 may be utilized to merge a database template table with a database table utilizing the received metadata. From operation 730, the routine 700 then ends.

Figure 8:
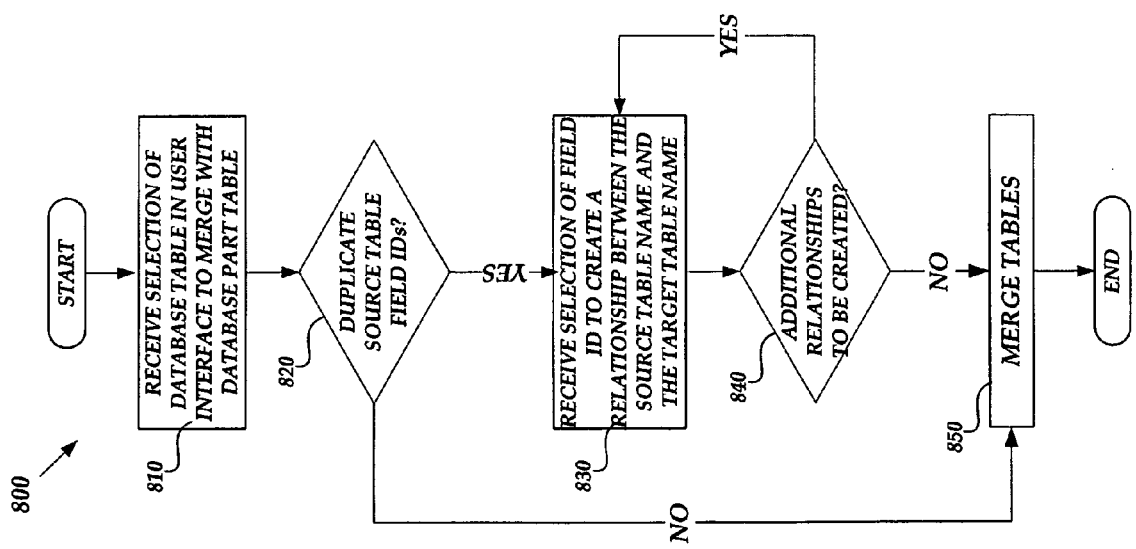
FIG. 8 is a flow diagram illustrating a routine for utilizing a user interface generated by a database application for defining relationships which may be utilized to merge a database part table with a database table, in accordance with one embodiment.

FIG. 8 is a flow diagram illustrating a routine 800 for utilizing a user interface generated by the database application 50 for defining relationships which may be utilized to merge a database part table with a database table, in accordance with one embodiment. The routine 800 begins at operation 810, where the database application 50 executing on the computer 2 receives the selection of a database table (i.e., a source table) in a user interface to merge with a database part table (i.e., a target table). For example, a user of the database application 50 may select a source database table from the drop-down list 410 in the user interface 400 shown in FIG. 4. It should be understood that selecting the source table creates a relationship with the target table in which a target table lookup field refers to a name associated with the source table. In accordance with an embodiment, the database application 50 may be configured to display the drop-down list 410 each time a relationship between a target table and a source table is to be created in the user interface 400.

From operation 810, the routine 800 continues to operation 820, where the database application 50 determines duplicate source table field IDs exist for the source database table selected from the drop-down list in the user interface. If, at operation 820, the database application 50 determines that duplicate field IDs exist, then the routine 800 continues from operation 820 to operation 830 where the database application 50 receives a selection of a field ID to create a relationship between the selected source table name and the target table name. In particular, the database application 50 may display a drop-down list of fields in a user interface (such as the drop-down list 510 in the user interface 500 of FIG. 5) from which the selection of the field ID may be made.

From operation 830, the routine 800 continues to operation 840 where the database application 50 determines whether additional relationships are to be created between the selected source database table and the target table. In particular, a user may wish to select additional field IDs for creating additional relationships between the source and target tables which may be utilized by the database application 50 to merge the tables. If, at operation 840, the database application 50 determines that additional relationships are to be created, then the routine 800 returns to operation 830 where the database application 50 receives a selection of another field ID to create another relationship between the selected source table name and the target table name.

If, at operation 840, the database application 50 determines that additional relationships will not be created (i.e., the user only wishes to create a relationship using only one source table field ID), then the routine 840 continues to operation 850 where the database application 50 may be utilized to merge the selected source table with the target table using the relationship created at operation 810 or the relationships created at operation 830. Returning now to operation 820, if the database application 50 determines that duplicate field IDs do not exist for the selected source database table, then the routine 800 branches from operation 820 to operation 850. From operation 850, the routine 800 then ends.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of utilizing a schema for defining a join relationship, the schema being utilized for merging a database part table with a database table by a database application executing on a computer system, comprising:

receiving, in the database application, target table metadata associated with a database part in a plurality of relationship elements in the schema, the database part comprising a target table, wherein an element in the plurality of relationship elements functions as a container for a set of relationships, the set of relationships defining a plurality of merges for the database part table and the database table, wherein the database application provides a user option to at least one of accept and reject one or more of the plurality of merges defined by the set of relationships;

receiving, in the database application, source table metadata associated with a database comprising a source table to be joined with the target table in the plurality of relationship elements in the schema, the source table metadata describing a relationship to a class of tables existing outside of the target table;

receiving, in the database application, join type metadata in the plurality of relationship elements in the schema, the join type metadata defining how data in the target table is to be merged with data in the source table; and in response to receiving the target table metadata and the source table metadata, merging the target and source tables utilizing the join type metadata.

2. The method of claim 1, wherein receiving target table metadata in the plurality of relationship elements in the schema comprises receiving target table metadata in a target lookup field element in the schema, wherein the target table metadata in the target lookup field element is utilized to create a lookup column in the target table, wherein the lookup column contains values to be utilized as the contents of at least one field located in the source table.

3. The method of claim 2, wherein receiving target table metadata in the target lookup field element comprises receiving at least one of the following: first metadata describing a class of tables associated with a lookup column field in the lookup column, second metadata describing a string used to identify a name for the lookup column field, third metadata describing a string used to provide a caption for the lookup column field in a user interface generated by the client application, fourth metadata describing a required property value for the lookup column field, fifth metadata describing an index value for the lookup column field, wherein the index value is utilized to determine whether the lookup column field is indexed, and sixth metadata describing whether the lookup column field allows multiple values.

4. The method of claim 1, wherein receiving target table metadata in the plurality of relationship elements in the schema comprises receiving target table metadata in at least one of a target table identification element and a target table name element in the schema.

5. The method of claim 1, wherein receiving source table metadata associated with the database in the source table to be joined with the target table in the plurality of relationship elements in the schema comprises receiving source table metadata in at least one of a source table identification element, a source table name element, a source field identification key element, and a source field identification lookup element in the schema.

6. The method of claim 1, wherein receiving join type metadata in the plurality of relationship elements in the schema comprises receiving at least one of first metadata specifying a source outer join in which records from the source table are merged into the target table and second metadata specifying a target outer join in which records from the target table are merged into the source table.

7. The method of claim 1, wherein receiving, in the database application, target table metadata associated with the database part in a plurality of relationship elements in the schema, comprises receiving target table metadata in a plurality of markup language elements.

8. The method of claim 1, wherein receiving, in the database application, target table metadata associated with the database part in a plurality of relationship elements in the schema comprises receiving target table metadata associated with a database template.

* * * * *